Figure 1:
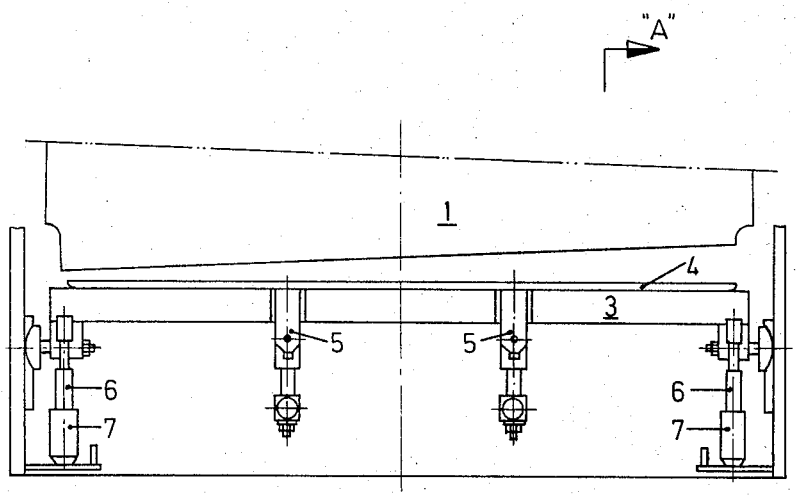

United States Patent
Zyl

[11] 3,842,699
[45] Oct. 22, 1974

[54] SHEARING MACHINES
[75] Inventor: Josias Van Zyl, Northcliff, South Africa
[73] Assignee: Intermenua (Proprietary) Limited, Johannesburg, South Africa
[22] Filed: July 31, 1972
[21] Appl. No.: 276,739

[52] U.S. Cl............... 83/157, 83/456, 83/694
[51] Int. Cl............................. B26d 1/08
[58] Field of Search ........... 83/157, 167, 454, 456, 83/694, 373, 459

[56] References Cited
UNITED STATES PATENTS

| | | |
|---|---|---|
| 2,933,966 | 4/1960 | Dehn .................. 83/373 |
| 3,126,816 | 3/1964 | Thompson ............ 83/157 X |
| 3,421,394 | 1/1969 | Ammons et al........ 83/157 |
| 3,492,898 | 2/1970 | Benz .................... 83/157 |
| 3,651,750 | 1/1972 | Hanni ................... 83/157 |

Primary Examiner—Francis S. Husar
Assistant Examiner—W. D. Bray
Attorney, Agent, or Firm—Stevens, Davis, Miller & Mosher

[57] ABSTRACT

A shearing machine of the kind provided with a displaceable supporting table in which displacement of the table takes place against a hydraulic biasing force.

7 Claims, 2 Drawing Figures

SHEARING MACHINES

This invention relates to shearing or cutting machines of the kind provided with a displaceable supporting table and is more particularly concerned with an improved form of such supporting table.

Shearing or cutting machines having a displaceable supporting table have recently become known to those engaged in the field of machine tools. Such machines have as their main purpose distortion-free shearing.

One arrangement comprises a shearing machine having a first fixed blade and a second blade movable over the first blade to set up a shearing or cutting action along the leading edges of the blades, a continuous yieldable support located in a resting position adjacent to the leading edge of the first blade in the path of the second blade and biasing means acting to resist displacement of the support from its resting position as the second blade is advanced over the first blade. The arrangement employs as biasing means helical springs or spring washers manufactured from suitable steels.

It has been found that with continuous use of the machine, particularly when such use is associated with heavy loading of the machine, there is a tendency for the machine to shear with an increasing degree of distortion.

It is an object of the present invention to provide a shearing machine having a displaceable supporting table in which the tendency for the degree of distortion to increase with use is countered to a large extent.

In the case of the particular arrangement of the shearing machine referred to above, one end of the supporting table is attached to the moving blade. This may, under certain circumstances, cause inconvenience. A further object of the present invention is to provide an improved form of machine which overcomes to a large extent this inconvenience.

According to the invention there is provided a shearing machine of the kind having a displaceable supporting table comprising hydraulic biasing means adapted, during operation of the machine, to resist displacement of the supporting table.

Further according to the invention, the hydraulic biasing means acts on the supporting table in a direction opposed to the direction of the movable blade during shearing.

The hydraulic biasing means may include a piston and cylinder which operate between the supporting table and the frame of the machine, the arrangement being one in which displacement of the table during operation of the machine is adapted to take place against a constant pressure supplied in the cylinder.

Preferably a piston and cylinder is provided at or towards both extremities of the supporting table. In this case the rod of each piston may be attached to the supporting table while the cylinders may be attached to the machine frame. Preferably, also, the piston rod and cylinders are attached, respectively, to the supporting table and machine frame to allow relative pivotal movement to take place.

Also, according to the invention, a constant pressure is applied in the cylinder through the use of a valve combining the functions of a reducer and a bleed valve.

Figure 2:
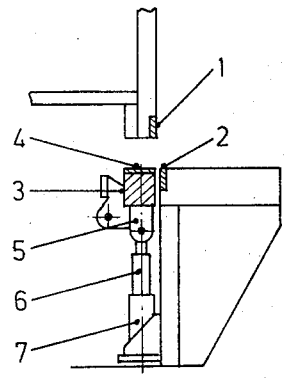

By way of example only, a preferred embodiment of the invention will now be described with reference to the accompanying drawings in which:

FIG. 1 is a diagrammatic front elevation of a shearing machine of the kind having a supporting table in which the table is shown mounted on pistons and cylinders, and FIG. 2 is a section on the line AA' of FIG. 1, with parts broken away.

The shearing machine comprises an upper moving blade 1 and a lower fixed blade 2. Located adjacent to the lower fixed blade 2 in the path of the moving blade 1 is a supporting table 3 having resting on it a leaf spring 4. The spring 4 is bowed along its length so that when resting in its free condition, the central portion of the spring curves towards the moving blade 1. A stirrup arrangement 5 is employed to draw the spring down onto the supporting table 4 in a non-operative condition to the shearing machine.

The extremities of the supporting table 3 are pivotally connected to the rods 6 of the pistons which cooperate with cylinders 7 mounted to the frame of the machine. In other words, the piston and cylinders are mounted between the table 3 and the frame of the machine and act on the supporting table in a direction opposed to the direction moved by the blade during shearing.

Hydraulic fluid under pressure is supplied through a valve (not shown) to each cylinder 7 so that displacement of the table during operation of the machine takes place against pressure provided in the cylinder. The valve employed has a bypass allowing the functions of a reducer valve and a bleed valve to be combined in a single valve. As a result hydraulic fluid from the hydraulic system of the machine is passed under constant pressure to the cylinders 7.

The mounting between the table 3 and the piston rod 6 and the cylinder 7 and the machine frame allows for relative pivotal movement so that displacement of the table along paths other than along the pistons' lines of travel can be accommodated.

As blade 1 is moved downwards over blade 2 to set up a cutting or shearing action along their leading edges, blade 1 causes supporting table 3 to be displaced from its resting position adjacent to blade 2. Such displacement takes place against the biasing action provided by the pistons displacing hydraulic fluid under constant pressure from the cylinders 7.

In the above arrangement of the invention, the biasing force is constant throughout the downward movement of the pistons. It may, however, be preferable, under certain circumstances, to allow downward movement of the pistons to take place against an increasing biasing force which may be achieved through the provision of a plurality of bleed valves which are brought into operation successively.

After completion of the cutting or shearing operation, blade 1 is raised again under the action of the constant pressure applied in the cylinders. If the cylinders 7 form part of the hydraulic system of the shearing machine, raising of the supporting table after the shearing action is complete will be accomplished automatically.

Many forms of the invention exist, each differing in matters of details only and in no way departing from the scope of the invention. Thus, under certain circumstances, it may be preferable to provide additional hydraulic cylinders spaced along the length of the supporting table. Particular conditions may require a shearing machine having a particularly short supporting table in which case it may be found that only one cylinder suffices.

It has been found that shearing machines having their displaceable supporting table biased in the manner provided for by the invention do not display a tendency for the distortion-free shearing ability of the machine to fall off with use of the machine.

I claim:

1. A shearing machine comprising a displaceable supporting table, and at least one cooperating piston and cylinder adapted to operate between the supporting table and a frame of the machine to resist displacement of the table, the arrangement being one in which displacement of the supporting table during operation of the machine is adapted to take place against a constant pressure applied in the cylinder.

2. A shearing machine as claimed in claim 1 in which a constant pressure is applied in the cylinder through the use of a valve combining the functions of a reducer valve and a bleed valve.

3. A shearing machine comprising a displaceable supporting table, hydraulic biasing means adapted, during operation of the machine, to resist displacement of the supporting table, and a movable blade, said hydraulic biasing means acting on the supporting table in a direction opposed to the movement of the movable blade during shearing, and in which said hydraulic biasing means includes a cooperating piston and cylinder which operate between the supporting table and the frame of the machine, the arrangement being one in which displacement of the supporting table during operation of the machine is adapted to take place against a constant pressure applied in the cylinder.

4. A shearing machine as claimed in claim 3 in which a cooperating piston and cylinder are provided at or towards both extremities of the supporting table.

5. A shearing machine as claimed in claim 2 in which the rod of each piston is attached to a supporting table while each cylinder is attached to the machine frame.

6. A shearing machine as claimed in claim 4 in which a constant pressure is applied in the cylinder through the use of a valve combining the functions of a reducer valve and bleed valve.

7. A shearing machine as claimed in claim 5 in which the piston rod and cylinder are attached respectively to the supporting table and machine frame to allow relative pivotal movement to take place between them.

* * * * *